April 7, 1942. W. H. BAUMKER 2,278,760
SEAT POST MOUNTING
Filed Oct. 14, 1940 2 Sheets-Sheet 1
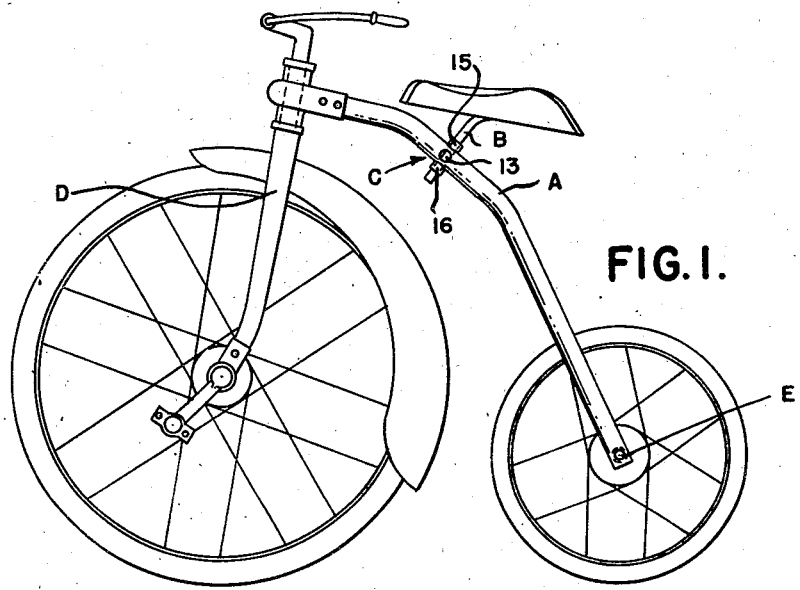
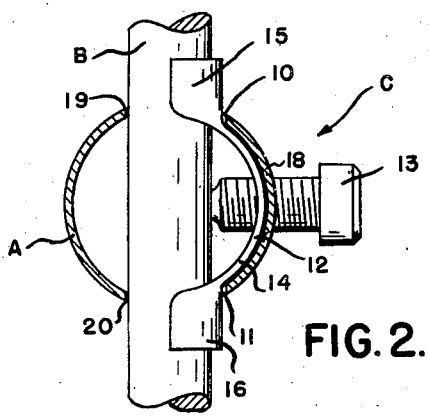
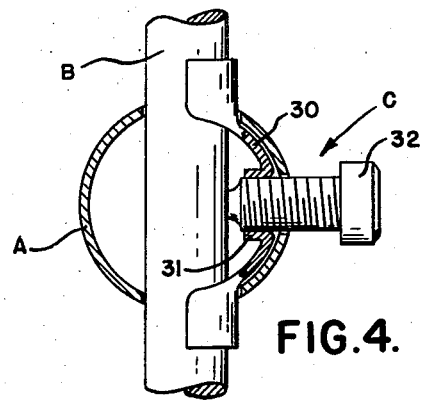
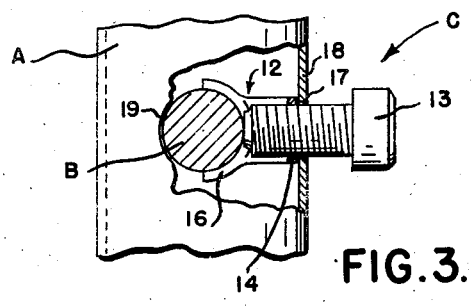
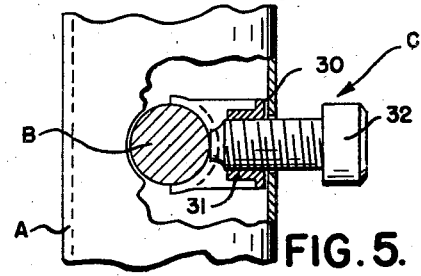
INVENTOR.
WILLIAM H. BAUMKER
BY
ATTORNEYS April 7, 1942.   W. H. BAUMKER   2,278,760
SEAT POST MOUNTING
Filed Oct. 14, 1940   2 Sheets-Sheet 2

INVENTOR.
WILLIAM H. BAUMKER
BY
ATTORNEYS

UNITED STATES PATENT OFFICE 2,278,760

SEAT POST MOUNTING

William H. Baumker, Toledo, Ohio, assignor, by mesne assignments, to The Hettrick Manufacturing Company, Toledo, Ohio, a corporation of Ohio Application October 14, 1940, Serial No. 361,160

6 Claims. (Cl. 287—54)

This invention relates generally to seat post mountings and refers more particularly to mountings for seat posts of velocipedes.

Heretofore it has been customary, when mounting seat posts in tubular backbones of velocipedes, to hold such posts in position by means of adjusting screws that threadedly engaged a wall of the backbone. Usually such backbone walls were thin and formed of relatively soft metal, hence stripping of threads in the backbone occurred frequently when the screws were tightened. To overcome this, some manufacturers mounted sleeves upon or made special castings for the backbones to provide extra wall thickness for the screws. However, this procedure was not satisfactory because such parts added materially to the cost of manufacture and also formed objectionable obstructions on the outside of the backbones that caused paint runs when paint was applied to the assembly.

In the present instance the objectionable features referred to have been overcome entirely by a mounting wherein means is provided for holding the seat post in a more secure and economical manner and wherein the major parts of the mounting except the adjusting screw are inside the tubular backbone. More specifically, it is an object of the present invention to provide a strong and durable mounting that is simple in construction, inexpensive to manufacture, easy to install, and effective and efficient in operation. Other objects, advantages and novel details of construction of this invention will be made more apparent as this description proceeds, especially when considered in connection with the accompanying drawings, wherein:

Figure 1 is a fragmentary side elevation of a velocipede having a seat mounting embodying my invention;

Figure 2 is a vertical sectional view through the backbone and showing the mounting for the seat post;

Figure 3 is a top plan view of the structure shown in Figure 2, with parts broken away and in section;

Figure 4 is a view similar to Figure 2 but showing a slight modification;

Figure 5 is a top plan view of the structure shown in Figure 4, with parts broken away and in section;

Figure 6:
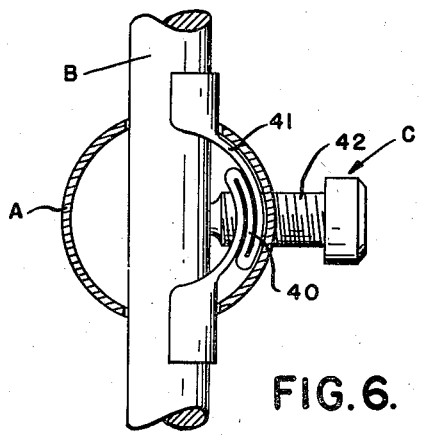
Figure 6 is a view similar to Figure 2 but showing another modification.

Referring now to the drawings, A is the backbone, B is the seat post, and C is the mounting embodying my invention.

As shown, the backbone A extends between the front fork D and rear axle E of the velocipede and is tubular in form. The seat post B is cylindrical in configuration and is mounted for adjustment in vertically aligned holes 10 and 11 in the backbone.

The mounting C comprises a clamping member 12 and an adjusting member 13 which are both free of and movable relative to the backbone A and post B. Preferably the clamping member 12 is a relatively thick stamping having a bow-shaped central portion 14 and substantially U-shaped end portions 15 and 16, while the adjusting member 13 is in the form of a screw that threadedly engages the central portion 14 of the clamping member and is adapted to bear against the seat post B.

In the present instance, the screw 13 is free and clear of the backbone A inasmuch as the opening 17 therefor is larger than the external diameter of the screw threads. The bowed portion 14 is substantially concentric with the adjacent curved portion 18 of the backbone while the U-shaped end portions 15 and 16 extend vertically through the aligned holes 10 and 11 in the backbone and embrace the seat post B. Thus, when the screw 13 is tightened, the bowed portion 14 will be drawn toward or against the curved portion 18 of the backbone and the inner end of the screw 13 will bear against and force the seat post B into firm engagement with the remote edges 19 and 20 of the holes 10 and 11. Such U-shaped end portions 15 and 16 will effectively prevent the stamping 12 from turning while the screw 13 is being tightened.

In Figures 4 and 5 I have illustrated a slight modification wherein the bowed portion 30 has an annular interiorly threaded flange 31 for receiving the screw 32. Other than this, the construction and operation are the same as in Figures 2 and 3.

Figure 7:
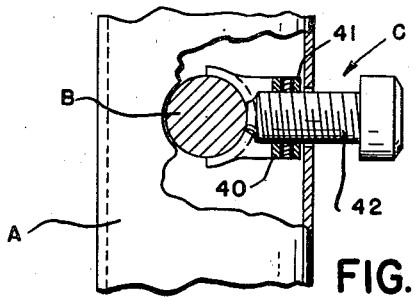
Figure 7 is a top plan view of the structure shown in Figure 6, with parts broken away and in section.

In Figures 6 and 7 I have illustrated another modification in which intermediate parts 40 of the bowed portion 41 are return-bent and arranged in overlapping relation to provide added thickness for the screw 42. Other than this, the construction and operation are the same as in Figures 2 and 3.

Figure 8:
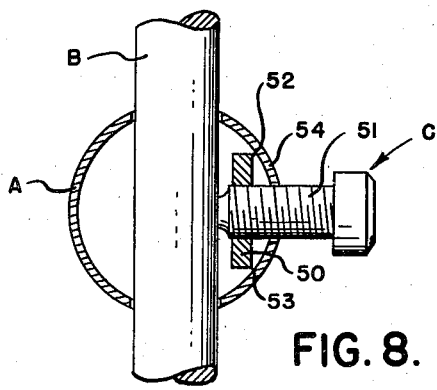
Figure 8 is a view similar to Figure 2 but showing another modification.
Figure 9:
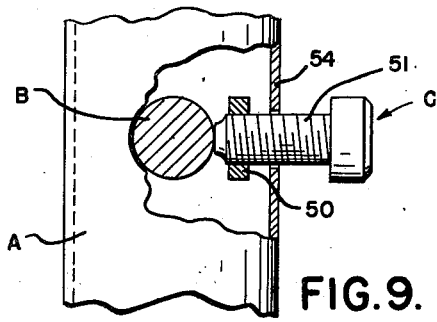
Figure 9 is a top plan view of the structure shown in Figure 8, with parts broken away and in section.

In Figures 8 and 9 I have illustrated another modification wherein a thick, substantially rectangular-shaped block or bar 50 is provided for engagement with the screw 51. In this construction the dimensions of the block 50 are such that the corners 52 and 53 thereof will engage the adjacent curved portion 54 of the backbone when the screw 51 is tightened. To prevent the block 50 from turning when the screw 51 is initially adjusted, the screw 51 may be pulled outward until the corners 52 and 53 of the block 50 engage the curved portion 54 of the backbone whereupon said screw may be tightened.

Figure 10:
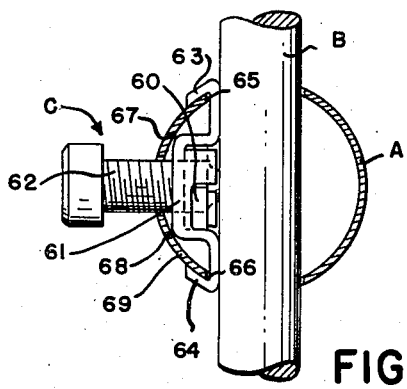
Figure 10 is a view similar to Figure 2 but showing another modification.
Figure 11:
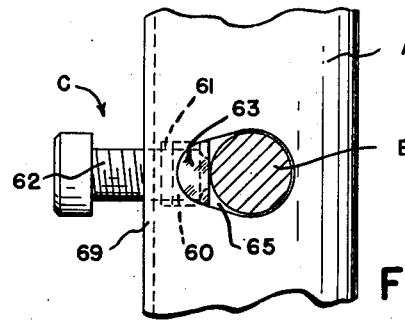
Figure 11 is a top plan view of the structure shown in Figure 10, with parts broken away and in section.

In Figures 10 and 11 I have illustrated another modification wherein a standard form of nut 60 is non-rotatively held in a sheet metal carrier 61 and is engaged by a screw 62. In this construction the carrier 61 has endwise extensions or wings 63 and 64 that project through the holes 65 and 66 in the backbone A and are return-bent over the outer edges of said openings. Thus, when the screw 62 is tightened, the corners 67 and 68 of the carrier will be drawn against the adjacent curved portion 69 of the backbone, while the inner end of the screw 62 bears firmly against the seat post B as aforesaid. The extensions 63 and 64 will not only maintain the carrier 61 and nut 60 in place, but will also cooperate with the backbone A to prevent the carrier and nut from turning when the screw 62 is tightened.

Thus, from the foregoing, it will be apparent that the elements 12, 30, 41 and 50, respectively, constitute special nuts and function similar to the standard nut 60 in so far as cooperation with the respective screws is concerned. In each instance, the seat post B is engaged and forced by the inner end of the respective screws against the remote edges of the vertically aligned holes in the backbone so that a three-point clamp is provided for the seat post. Likewise, in each instance, the nuts are effectively prevented from turning while the screws are being tightened.

What I claim as my invention is:

1. A seat post mounting comprising a tubular backbone having aligned holes in diametrically opposite sides thereof and provided in another side intermediate said aligned holes with a single opening, a seat post extending freely through said aligned holes, and means for holding the seat post in an adjusted position relative to said backbone including a clamping member within the tubular backbone between the single opening and post and movable back and forth relative thereto, said clamping member being free of both the backbone and post, said clamping member having a bowed portion substantially concentric with the intermediate side of the backbone and having aligned channel-shaped end portions substantially concentric with and embracing the seat post and extending through the aligned holes in the backbone, the bowed portion of the clamping member having a threaded hole registering with the single opening in the backbone, and an adjusting member disposed at right angles to and free of the backbone and post, said adjusting member extending freely through the single opening in the backbone, engaging the threaded hole in the clamping member and having a portion thereof bearing against the seat post.

2. A seat post mounting comprising a tubular backbone having aligned holes in diametrically opposite sides thereof and provided in another side intermediate said aligned holes with a single opening, a seat post extending freely through said aligned holes, and means for holding the seat post in an adjusted position relative to said backbone including a stamping within the tubular backbone between the single opening and post and movable back and forth relative thereto, said stamping being free of both the backbone and post, said stamping having a bowed portion substantially concentric with the intermediate side of the backbone and having aligned substantially U-shaped end portions substantially concentric with and embracing the seat post, the bowed portion of the stamping having a threaded hole registering with the single opening in the backbone, and a screw disposed at substantially right angles to and free of the backbone and post, said screw extending freely through the single opening in the backbone, engaging the threaded hole in the stamping and having its inner end bearing against the seat post.

3. A seat post mounting comprising a tubular backbone having aligned holes in diametrically opposite sides thereof and provided in another side intermediate said aligned holes with a single opening, a seat post extending freely through said aligned holes, and means for holding the seat post in an adjusted position relative to the backbone including a stamping within the backbone between the single opening and post and movable back and forth relative thereto, said stamping having endwise extensions projecting through the aligned holes in the backbone and return-bent over the outer edges of said holes, a nut non-rotatively held by said stamping in alignment with the single opening, and an adjusting element disposed at right angles to and free of the backbone and post, said adjusting member extending freely through the single opening in the backbone, threadedly engaging said nut, and having a portion thereof bearing against the seat post.

4. A seat post mounting comprising a tubular backbone having aligned holes in diametrically opposite sides thereof and provided in another side intermediate said aligned holes with a single opening, a seat post extending freely through said aligned holes, and means for holding the seat post in an adjusted position relative to the backbone including a carrier within the backbone between the single opening and post and movable back and forth relative thereto, said carrier having endwise extensions projecting through the aligned holes in the backbone and anchored upon the outer edges of said holes, a nut non-rotatively held by said carrier in alignment with the single opening, and a screw disposed at right angles to and free of the backbone and post, said screw extending freely through the single opening in the backbone, threadedly engaging said nut, and having its inner end bearing against the seat post.

5. A seat post mounting comprising a tubular backbone having aligned holes in diametrically opposite sides thereof and provided in another side intermediate said aligned holes with a single opening, a seat post extending freely through said aligned holes, and means for holding the seat post in an adjusted position relative to said backbone including a nut within the backbone between the single opening and post and movable back and forth relative thereto, an adjusting element disposed at substantially right angles to and free of the backbone and post, said adjusting element extending freely through the single opening in the backbone, threadedly engaging the nut, and having a portion thereof bearing against the seat post, and means extending through the aligned holes in the backbone and cooperating with said nut to keep it from turning during adjustment of said element.

6. A seat post mounting comprising a tubular backbone having aligned holes in diametrically opposite sides thereof and provided in another side intermediate said aligned holes with a single opening, a seat post extending freely through said aligned holes, and means for holding the seat post in an adjusted position relative to said backbone including a nut within the backbone between the single opening and post and movable back and forth relative thereto, a screw disposed at substantially right angles to and free of the backbone and post, said screw extending freely through the single opening in the backbone, threadedly engaging the nut, and having its inner end bearing against the seat post, and means extending through the aligned holes in the backbone and cooperating with said nut to keep it from turning during adjustment of said screw.

WILLIAM H. BAUMKER.